United States Patent [19]

Rau

[11] Patent Number: 4,968,472
[45] Date of Patent: Nov. 6, 1990

[54] METHOD FOR PRODUCTION OF A HOLLOW BODY

[75] Inventor: Thomas Rau, Liebenau, Fed. Rep. of Germany

[73] Assignee: Volkswagen AG, Fed. Rep. of Germany

[21] Appl. No.: 358,177

[22] Filed: May 26, 1989

Related U.S. Application Data

[60] Division of Ser. No. 228,770, Aug. 4, 1988, abandoned, which is a continuation of Ser. No. 58,135, Jun. 4, 1987, abandoned.

[30] Foreign Application Priority Data

Jun. 11, 1986 [DE] Fed. Rep. of Germany ....... 3619628

[51] Int. Cl.$^5$ .................... B29C 61/00; B29C 69/00
[52] U.S. Cl. ................................ 264/231; 264/257; 264/310
[58] Field of Search ............... 264/231, 257, 310, 311, 264/312

[56] References Cited

U.S. PATENT DOCUMENTS

| 2,828,239 | 3/1958 | Fischer | 156/195 |
| 3,464,879 | 9/1969 | Poulsen | 156/425 |
| 3,979,250 | 9/1976 | Drostholm | 156/289 |

FOREIGN PATENT DOCUMENTS 2842531 4/1979 Fed. Rep. of Germany.

Primary Examiner—Jay H. Woo
Assistant Examiner—Jeremiah F. Durkin, II
Attorney, Agent, or Firm—Brumbaugh, Graves, Donohue & Raymond

[57] ABSTRACT

A method for forming a hollow body during which, for the purpose of impression of internal stresses, the body is subjected during its production to axial forces and moments. For this purpose the hollow body is supported from the inside by a mandrel constituted by disks which can move relative to one another and which, accordingly, do not obstruct axial expansion and twisting of the hollow body.

3 Claims, 1 Drawing Sheet

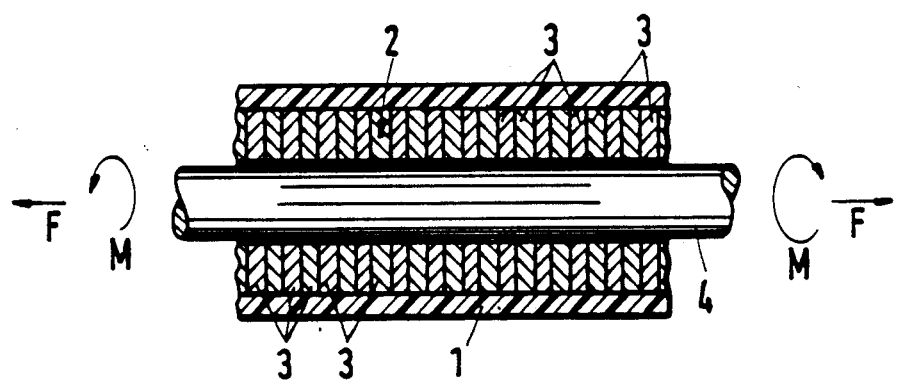

METHOD FOR PRODUCTION OF A HOLLOW BODY

This application is a divisional of application Ser. No. 288,770 filed Aug. 4, 1988, now abandoned which in turn is a continuation of application Ser. No. 058,135 filed June 4, 1987, now abandoned.

BACKGROUND OF THE INVENTION

The invention relates to a method for the production of a hollow body which is subjected to a torque and/or an axial force during its production while being internally supported, for the purpose of impressing internal stresses.

Various methods and arrangements are known which aim at the introduction of internal stresses into hollow bodies, composed of fiber-reinforced layers of plastics, during the production thereof. The internal stresses increase the fatigue strength of the bodies during their utilization. Such hollow bodies, which may be utilized, for example, as drive shafts in automobiles, offer, in comparison with metal constructions, the advantage of lower weight and decreased sound transmission. However, they suffer from the risk of cracks forming, due to forces or stresses in the layers acting perpendicular to the alignment of the fibers, which decrease the fatigue resistance of the hollow body during operation. Such crack formation is counteracted by the introduction of internal stresses.

In order to generate internal stresses, it is necessary to subject the hollow body during its production to forces and torques, e.g., while being heated. In order to prevent a decrease in the diameter of the hollow body during the application of such loads, the body must be supported from the inside. The use of a mandrel towards such end is known. However, during the generation of the internal stresses, i.e., during the application of the outside forces and torques, such a mandrel suffers from the disadvantage that it obstructs deformations, at least of the inner layer of the hollow body, in the direction of the circumference and in the axial direction.

With respect to this aspect, some known methods and arrangements which produce the inner supporting force by pneumatic or hydraulic pressure are of greater advantage. However, the necessity of sealing of these arrangements creates problems. This is frequently the reason for breakdowns in the production process.

SUMMARY OF THE INVENTION

It is an object of the invention to provide a method for forming a hollow body of the above-discussed type utilizing a mandrel which, while being simple in its construction, ensures a flawless inner support of the hollow body, on the one hand, and does not obstruct the axial expansion and twisting of the hollow body, on the other hand.

Pursuant to this object, and others which will become apparent hereafter, one aspect of the present invention resides in supporting the hollow body on a mandrel comprised of a plurality of disks which are rotatable relative to one another and axially movable. In a further embodiment a common arbor is passed through the disks with clearance.

Due to the fact that the hollow body is supported on a mandrel which is constructed of disks which can be moved relative to one another in the circumferential direction and in the axial direction and which do not change their outer diameter, the mandrel can adjust itself, as it were, to deformations of the hollow body in the circumferential direction and in the axial direction, without impairment of the radial support of the hollow body.

BRIEF DESCRIPTION OF THE DRAWING

The single FIGURE shows an axial section of a mandrel pursuant to the present invention.

DETAILED DESCRIPTION OF THE PREFERRED EMBODIMENT

A hollow body which is fashioned from a plurality of fiber-reinforced plastic layers, in a manner known in itself and therefore not illustrated, is designated by -1-. During the production process, i.e., e.g., during a hardening or thermosetting process of the plastic material or thereafter at increased temperature, there are applied to the hollow body for the purpose of impression of internal stresses torques -M- and axial forces -F-. These loads result in a tendency of the hollow body -1- to contract, i.e., towards a decrease in its internal diameter. This contraction is counteracted, according to the invention, by supporting the hollow body -1- on an internal mandrel -2- as shown in the drawing. The mandrel is composed of a plurality of disks -3- which are independent of one another and therefore can move relative to one another. When the hollow body -1- expands in the axial direction, the disks -3- move and increase their distance from one another forming gaps. When the hollow body -1- twists, the individual disks turn relative to one another.

The disks -3- are passed through with a clearance by a common arbor -4-.

Accordingly, by means of the invention there is created a hollow body by supporting it on a mandrel which while providing a flawless support of a hollow body from the inside does not obstruct expansions and twisting of such body under the influence of outside forces and moments. This mandrel can also serve as winding spindle.

While the invention has been illustrated and described as embodied in a method which uses a mandrel for production of a hollow body, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method for producing a hollow cylindrical body comprising;

providing a mandrel comprising a plurality of separate flat, rigid annular disks, each having an outside diameter substantially equal to the inside diameter of the hollow body, said disks being separately supported with clearance on a central arbor and arranged in side-by-side relationship and rotatable and axially movable relative to each other;

forming fiber-reinforced plastic layers into a hollow cylindrical body on the outer surface of the mandrel; and inducing internal stresses in the fiber-reinforced plastic layers while permitting relative angular, radial and axial movement of the annular disks to allow the hollow body to deform axially, radially and torsionally.

2. A method for producing a hollow cylindrical body of fiber-reinforced plastic having internal stresses deliberately induced therein comprising the steps of:

providing a mandrel comprising a plurality of separate flat, rigid, annular disks, each having an outside diameter substantially equal to the desired inside diameter of said cylindrical body and being supported with clearance on a central arbor and arranged in side-by-side relationship independently of each other so as to be rotatably and axially movable relative to each other;

forming on the mandrel a plurality of layers of fiber-reinforced plastic into a hollow cylindrical body having a desired inside diameter; and subjecting the internally supported hollow body to at least one of rotational torque and axial force to induce internal stresses in the wall of the hollow body while permitting relative motion of the annular disks of the mandrel and maintaining the inside diameter of the hollow body substantially constant and allowing the hollow body to deform axially, radially or torsionally in response to at least one of rotational torque and axial force.

3. The method as defined by claim 2, wherein said method comprises the further step of heating the internally supported body while it is being subjected to at least one of rotational torque and axial force.

* * * * *